(12) United States Patent
Jänker et al.

(10) Patent No.: US 8,475,127 B2
(45) Date of Patent: Jul. 2, 2013

(54) METHOD AND DEVICE FOR CONTROLLING A ROTARY WING AIRCRAFT

(75) Inventors: Peter Jänker, Riemerling (DE); Valentin Klöppel, München (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 843 days.

(21) Appl. No.: 12/685,012

(22) Filed: Jan. 11, 2010

(65) Prior Publication Data

US 2010/0178167 A1 Jul. 15, 2010

(30) Foreign Application Priority Data

Jan. 13, 2009 (DE) .......................... 10 2009 004 814

(51) Int. Cl.
*B64C 27/615* (2006.01)
(52) U.S. Cl.
USPC .................................... 416/1; 416/24
(58) Field of Classification Search
USPC .................... 416/23, 24, 31, 98, 110
See application file for complete search history.

(56) References Cited

U.S. PATENT DOCUMENTS 5,409,183 A * 4/1995 Gunsallus ..................... 416/24

FOREIGN PATENT DOCUMENTS

| DE | 60101928 T2 | 1/2005 |
|---|---|---|
| DE | 102007020079 A1 | 10/2008 |
| WO | 2008147463 A2 | 4/2008 |

OTHER PUBLICATIONS

Communication from German Patent Office referencing Application No. 102009004814.6, dated Jan. 13, 2009.

\* cited by examiner

*Primary Examiner* — Richard Edgar
(74) *Attorney, Agent, or Firm* — Brooks Kushman P.C.

(57) ABSTRACT

The invention relates to a method for controlling a rotary wing aircraft with at least one main rotor, comprising a rotor head and rotor blades (12), arranged such that each rotor blade (12) is supported to be able to pivot or twist around the lengthwise axis of its blade on the rotor head and has at least one control flap (14) that can be deflected. According to the invention, the rotary wing aircraft is controlled solely by changing the respective blade pitch angle (X) by means of changing the flap control angle (Y) of the assigned control flaps (14) by the resulting blade pitch angle (X3) being set by applying the resulting flap angle (Y4) to the control flap (14), and the flap angle (Y4) being computed using an algorithm, the input quantities comprising the flap control angle (Y1) depending on the pilot primary control and the flap correction angle (Y2) depending on the secondary control.

12 Claims, 5 Drawing Sheets

METHOD AND DEVICE FOR CONTROLLING A ROTARY WING AIRCRAFT

The invention relates to a method for controlling a rotary wing aircraft of the type indicated in the preamble of Claim 1.

DE 10 2007 020 079 A1 discloses a control means of the main rotor of a helicopter. The main rotor comprises the rotor head and rotor blades, the rotor blades being mounted on the rotor head with the capacity to pivot or twist. Moreover, on each rotor blade, there is at least one control flap. In addition, the blade pitch angle on the blade root can be changed. This is done via a collective actuator or alternatively via a blade root actuator. Overall control of the helicopter is divided into primary control and secondary control and takes place generally by way of changing the pitch angle of the rotor blade. The primary control is used predominantly for pilot-dependent control and acts by changing the blade pitch angle on the blade root. Secondary control manages special problems typical of helicopters. It acts by way of deflection of the control flaps and thus causes a change of the blade pitch angle by torsion of the rotor blade. By applying two different blade pitch angle requirements to the rotor blade, mechanical superposition of the two blade pitch angles takes place, from which a resulting blade pitch angle follows. By setting the rotor blade with the resulting blade pitch angle, overall control takes place according to the inputs of the primary and secondary control.

For setting the resulting blade pitch angle, however, adaptation of the blade pitch angle on the blade root and changing of the blade pitch angle by means of torsion by actions of the control flaps are always necessary. Moreover, the superposition of the blade pitch angle from the primary and secondary control is only possible at a fixed ratio that is dictated by the torsional stiffness of the rotor blade. Furthermore, a regulation concept for overall control of the helicopter only by control flaps does not follow from the indicated document.

A generic method for controlling a rotary wing aircraft in which both primary and secondary controls are implemented solely by means of the control flaps is known from DE 601 01 928 T2.

The object of the invention is to enable periodic checking of the rotor blade integrity in a method of the indicated type.

This object is achieved for the method by the characterizing features of claim 1 in conjunction with the features of its preamble.

Other advantageous configurations of the invention form the subject matters of the dependent claims.

In the conventional manner, a rotary wing aircraft comprises a rotor head and rotor blades. The rotor blades are connected to the rotor head such that each rotor blade is supported to be able to pivot or twist along the lengthwise axis of its blade on the rotor head. Each rotor blade has at least one control flap that can be deflected. The control flap sits on the rear edge of the rotor blade. By deflecting the control flap in combination with the rotor blade that is supported in a partially torsionally soft or pivotable manner, the blade pitch angle can be adjusted. The rotary wing aircraft is controlled by changing the blade pitch angle over one rotor revolution. Overall control of the rotary wing aircraft is divided into pilot primary control and secondary control. Pilot primary control thus influences, for example, ascending and descending flight and horizontal maneuvering. To perform this control task, the setting angle of the rotor blade must be set according to pilot primary control. Secondary control is used to improve the flight-physical behavior of the rotary wing aircraft according to selected parameters. The blade pitch angle must therefore be set according to the requirements of secondary control.

In the method, both control requirements are managed by changing the blade pitch angle only by means of the control flap. Implementation of pilot primary control results in a corresponding flap control angle requirement in order to achieve a corresponding blade pitch angle. To implement secondary control, a flap correction angle requirement is generated. In order to take into account the two control requirements, the required flap control angle and the required flap correction angle are used to compute a resulting flap angle by means of an algorithm. By deflecting the control flap with the resulting flap angle, on the rotor blade a resulting blade pitch angle is set, via which overall control of the rotary wing aircraft is implemented. In this way, both primary and also secondary control requirements are transmitted to the rotor blade only by means of control flaps.

Exercising overall control of a rotary wing aircraft only by means of control flaps has the advantage of an enormous saving of weight. This is expressed especially in rotary wing aircraft particularly in their efficiency and maneuverability. Furthermore, this method can be optimally combined with known fly-by controls.

The algorithm for computing the resulting flap angle comprises superposition of the flap control angle with the flap correction angle. This constitutes a simple and efficient form of computing the resulting flap angle.

The input quantities of the algorithm for pilot primary control and secondary control are preferably weighted. This allows prioritization of control signals depending on need.

The rotor blade integrity is periodically checked according to the invention. For this purpose, the control flap is intentionally exposed to additional frequent sweeps of actuating signals. Thus, predetermined torsional excitation of the rotor blade is generated. Comparison of the blade response behavior with earlier values allows conclusions regarding the structural state of the rotor blade. With the finding that has been acquired from checking, the secondary control undertakes compensation of possible blade damage. Moreover, damage is communicated to the pilot.

According to one advantageous development, there is a secondary regulator. The latter attenuates blade flutter. This is especially important since blade flutter is promoted by the torsionally soft structure of the rotor blade. Moreover, dynamic loads that are caused by, for example, blade vortex interaction are reduced.

In a further advantageous version, for the secondary regulator, measured flight-physical values that are obtained by sensors and the assigned setpoint values are used. They are essentially the dynamic portions of the rotor forces and moments. Thus, flight-physical properties are optimally adapted at any time. Moreover, fuel consumption and flow separation can be observed.

Preferably, to support the pilot, there is an automatic flight control system (AFCS). It constitutes a further primary control element. When using AFCS, automatic primary control depending on flight properties is superimposed on pilot primary control. The latter can thus support the pilot during flight, or else can be configured to take over all control. Thus, a primary flap correction angle that has been produced in addition by automatic primary control is incorporated into the computation of the resulting flap angle.

For generating the primary flap correction angle, the automatic flight control system returns to the measured values of the flight status. They are obtained by connected sensors and are transmitted to the AFCS. Moreover, the setpoint values for the flight status are incorporated into generation of the primary flap correction angle.

In another advantageous version, the secondary regulator and or the AFCS work according to the $H_\infty$ method or the "least-mean-square method" or according to disturbance rejection by means of notch filters. This has the advantage of especially prompt and efficient control.

In one especially advantageous embodiment, there are sensors for detecting flight and ambient conditions as well as rotor forces and moments; they are connected by information technology to the control/regulating device. They provide the required feedback for regulation to the control/regulating device.

It is especially advantageous to design the control/regulating device as a central computer unit or as part of the on-board computer. In spite of the manifold information input, thus a fundamental integration capacity and interoperability are formed. Moreover, the system is flexible with respect to expansions.

In another advantageous embodiment, in addition to the control/regulating device and the control flaps, there is a blade root actuator. In an emergency, should the control flaps fail, it ensures controllability of the rotary wing aircraft. It directly influences the blade pitch angle mechanically on the blade root.

In particular, there is a collective actuator in a fixed system. It adjusts all rotor blades at the same time in their blade pitch angles. In doing so, a rod acts on each rotor blade on the same side and is connected via a sliding sleeve that turns concomitantly with the rotor and that allows vertical side-slipping up and down.

Moreover, there is a sliding sleeve that does not turn concomitantly and that is pushed vertically by an actuator that sits in a stationary system of the rotary wing aircraft. With movement of the actuator, this is transmitted to the concomitantly turning sliding sleeve and thus adjustment of the blade pitch angle is achieved.

Formation of the actuator as an electromechanical component is especially advantageous. Thus, fully electric control of the rotary wing aircraft is ensured.

Other advantages, features and possible applications of this invention will become apparent from the following description in conjunction with the exemplary embodiments shown in the drawings.

The invention is presented in detail below using the exemplary embodiments shown in the drawings.

The description, the claims, the abstract and the drawings use the terms and assigned reference numbers that are used in the list of reference numbers cited below. In the drawing:

Figure 1:
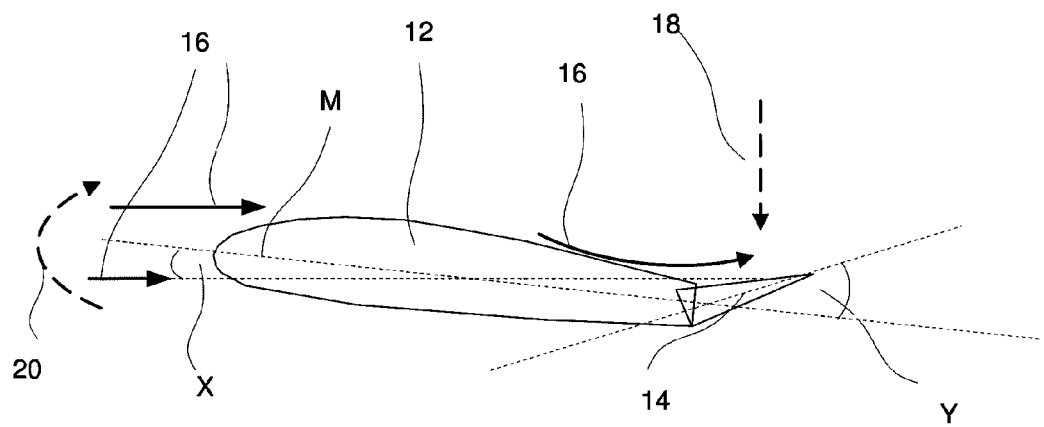
FIG. 1 shows the fundamental relationship between the blade pitch angle and the deflection of the control flap by the servo moment produced by the flap around the lengthwise axis of the blade.

FIG. 1 shows a rotor blade 12 with a profile chord M and a control flap 14. Furthermore, the incident flow 16 on the rotor blade 12 is shown. The profile chord M and incident flow 16 enclose the blade pitch angle X. Furthermore, the profile chord M with the control flap 14 forms the flap angle Y. By the impact of an air flow on the control flap 14, a force 18 is produced on the control flap 14. This force 18 causes a torsional moment 20 on the rotor blade 12, via which the blade pitch angle X is changed as a result of the torsionally soft configuration of the rotor blade 12. If, as shown in FIG. 1, the flap angle Y becomes positive, the incident flow 16 produces a force 18 that in turn produces a moment that acts in this way to increase the blade pitch angle X.

Figure 2:
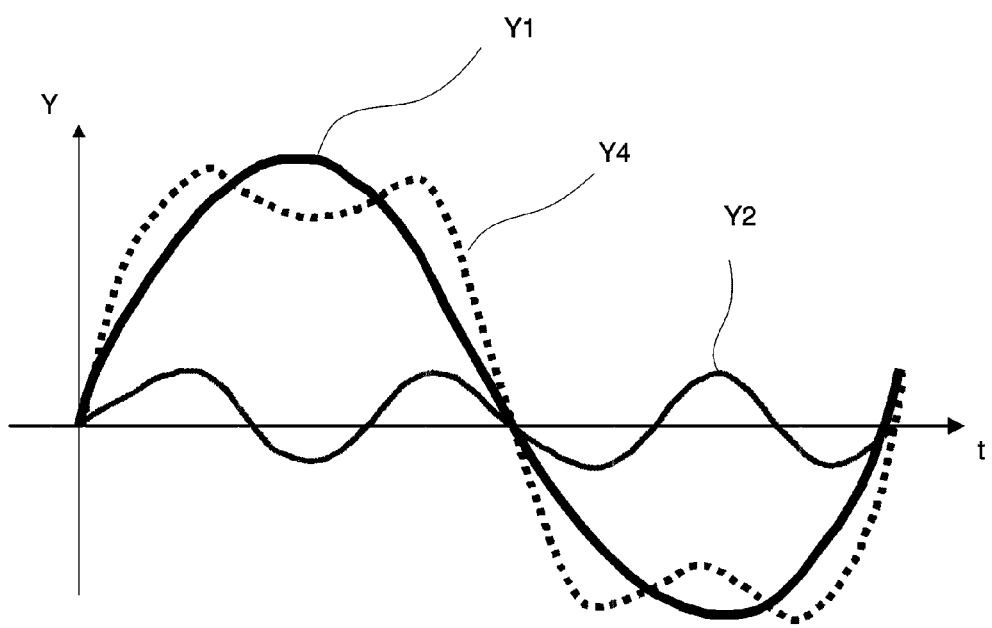
FIG. 2 shows the interplay of primary and secondary controls with respect to the flap angle.

FIG. 2 shows the plot of the resulting flap angle Y4 over time t for one blade revolution. To produce the resulting flap angle Y4, the cyclic requirement for a flap control angle Y1 is superimposed with the requirement for a flap correction angle Y2. The flap control angle Y1 is dependent on pilot primary control. The flap correction angle Y2 is dependent on secondary control that influences special flight-physical properties and as shown has a much higher frequency and lower amplitude. The control flap is deflected according to the resulting flap angle Y4 by the blade pitch angle X so that a resulting blade pitch angle X3 of the rotor blade is set.

Figure 3:
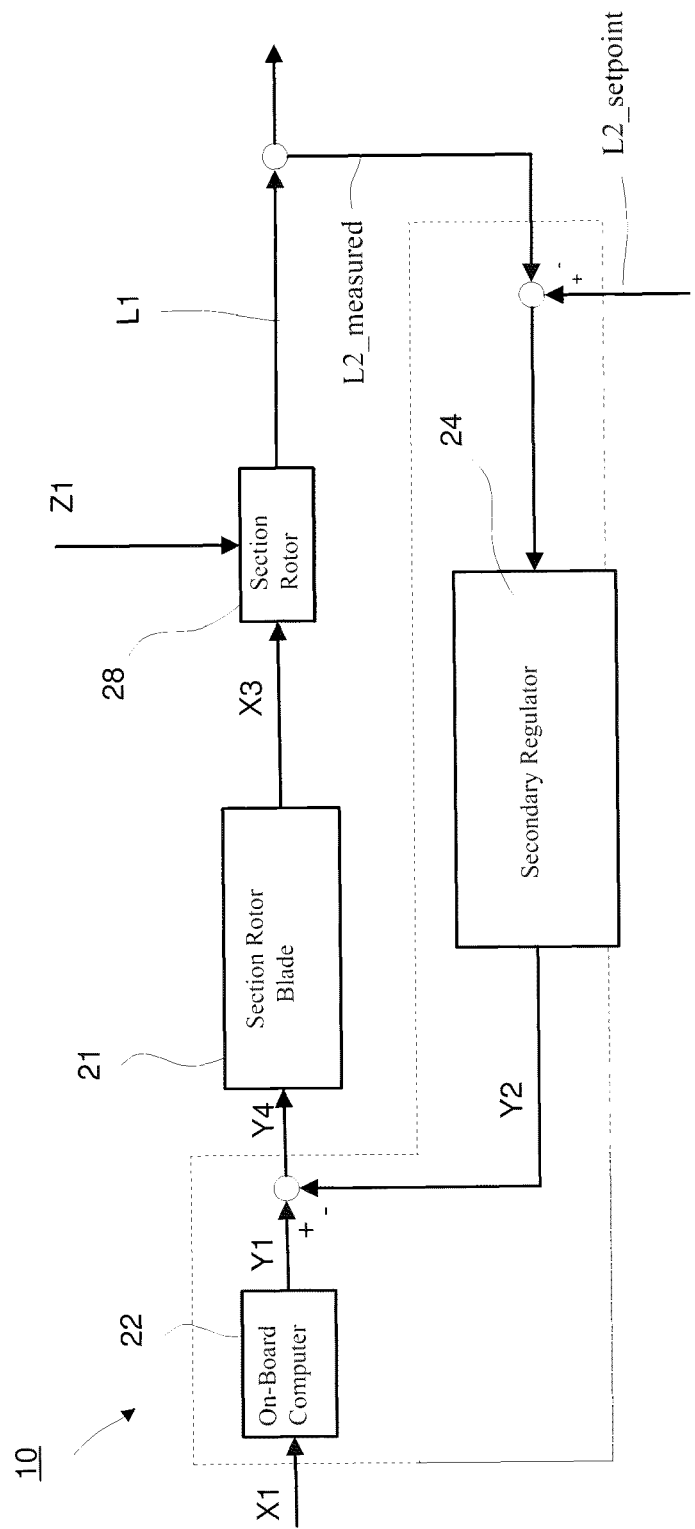
FIG. 3 shows a schematic, functional block diagram of a fundamental control/regulating device for managing typical helicopter problems, such as noise and vibrations, by means of flap control (secondary control)

Functionally, FIG. 3 schematically shows the control device of a rotary wing aircraft (primary control) and the regulating device for a secondary control with control flaps 14. The latter is used in contrast to primary control for managing typical helicopter problems (see below). The control/regulating device 10 comprises a section of the rotor blade 21, an on-board computer 22, a secondary regulator 24, and a section of the rotor 28. The pilot actuates the pilot primary control input X1. The on-board computer 22 generates a flap control angle Y1 therefrom. The latter is added to the flap correction angle Y2 to form a resulting flap angle Y4. The flap correction angle Y2 is fixed by the secondary regulator 24. The input quantities of the secondary regulator 24 are the dynamic portions L2 of the rotor forces and moments L2_measured that have been determined by special sensors, and the setpoint values of the dynamic portions of the rotor forces and moments L2_setpoint. The secondary regulator 24 in this way reduces, for example, fuel consumption, blade flutter, blade vortex interaction, vibrations or blade torsion oscillations.

The resulting flap angle Y4 via the rotor blade section 21 causes setting of the resulting blade pitch angle X3. The corresponding rotor forces and moments L1 are produced by the rotor section 28 by the resulting blade pitch angle X3 of the rotor blade. In this connection, the disturbance rotor Z1 is involved by action on the rotor section 28. The dynamic portions of the rotor forces and moments L2_measured, L2_setpoint are used, as already mentioned, as the input of the secondary regulator 24.

Figure 4:
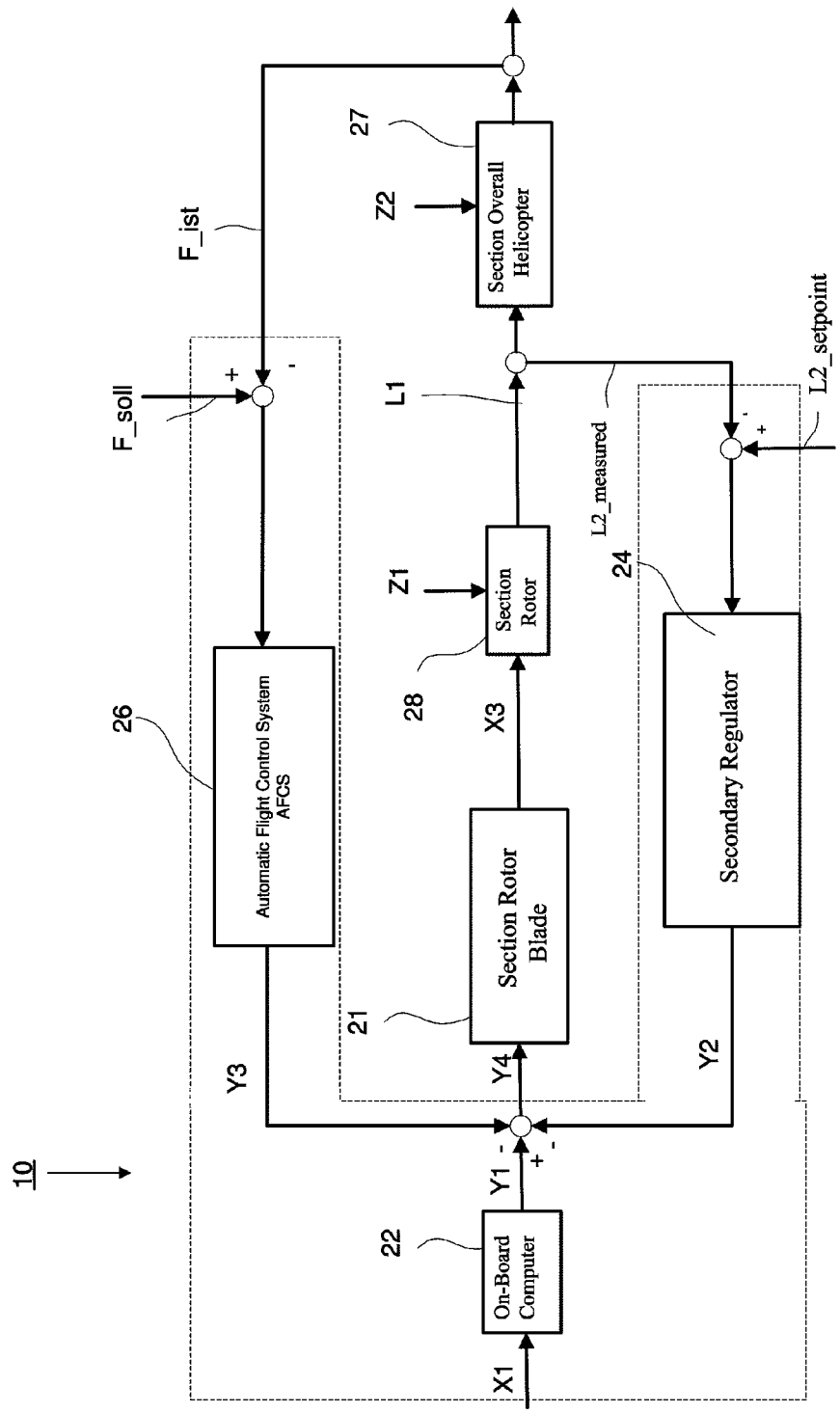
FIG. 4 shows a schematic, functional block diagram of a control/regulating device that additionally contains an automatic flight control system for flap control (primary control)

Functionally, FIG. 4 schematically shows the control/regulating device 10, as shown in FIG. 3, its being expanded by an automatic flight control system. Thus, in addition to the flap control angle Y1 and the flap correction angle Y2, the primary flap correction angle Y3 produced by the AFCS is incorporated into the computation of the resulting flap angle Y4. Depending on the resulting flap angle Y4 that was computed in this way, the resulting blade pitch angle X3 is set via the section rotor blade 21. Said blade pitch angle X3 acts over the rotor section together with the inflowing disturbances Z1 on the generated rotor forces and moments L1. They generate the flight status F_measured by means of the section overall helicopter 27. In this connection, a disturbance overall helicopter Z2 acts on the section overall helicopter. Depending on the setpoint values and measured values of the flight status F_measured, F_setpoint, the AFCS in turn generates the primary flap correction angle.

Figure 5:
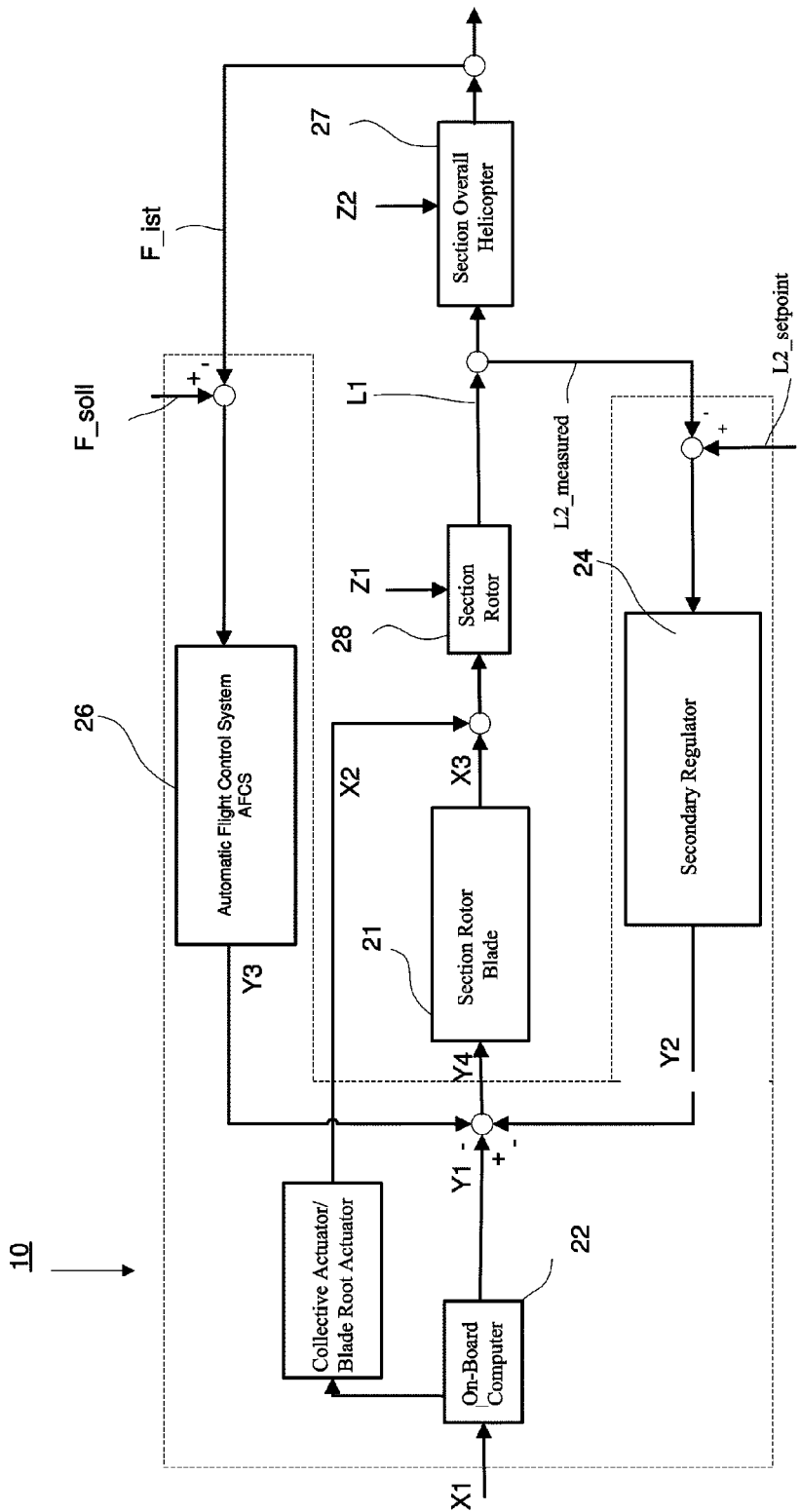
FIG. 5 shows a schematic, functional block diagram of activation in addition to flap control in the form of blade root activation (see FIG. 6)
Figure 6:
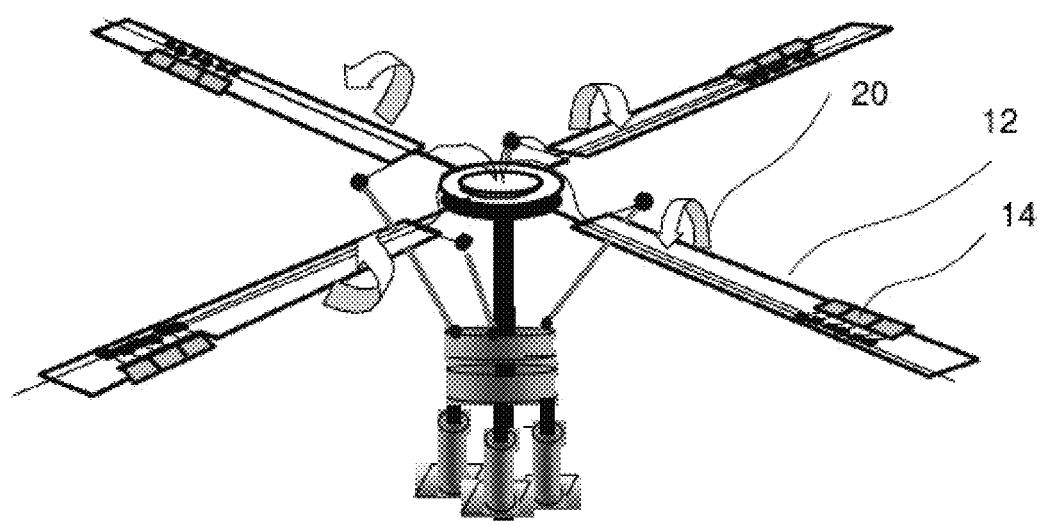
FIG. 6 shows different methods for producing the blade pitch angle.

In addition to pure changing of the blade pitch angle via the control flaps, FIG. 5 shows direct adjustment of the blade pitch angle on the blade root X2 according to FIG. 6. The latter is added to the resulting blade pitch angle X3 that is generated by flap control.

FIG. 6 shows two different approaches to changing the blade pitch angle of the rotor blade 12. The control flaps 14 based on their deflection produce a torsional moment 20 around the lengthwise axis of the blade. This changes the blade pitch angle either by way of a blade adjustment bearing on the blade root or, as in the case of a blade connection without bearings, by twisting the blade against its torsional stiffness. The blade root control adjusts the blade pitch angle via an actuator directly to the blade root.

In the manner explained in FIGS. 1 to 6, with use of the flap control, both the primary control and also the secondary control that is designed to mitigate typical helicopter problems can be implemented.

REFERENCE NUMBER LIST

10 Control/regulating device
12 Rotor blade
14 Control flap
16 Incident flow
18 Action of force
20 Generated torsional moment
21 Section rotor blade
22 On-board computer
24 Regulator secondary control
26 Automatic flight control system
27 Section overall helicopter
28 Section rotor
F_measured Flight status (measured value)
F_setpoint Flight status (setpoint value)
L1 Rotor forces and moments (static and dynamic portion)
L2_measured Rotor forces and moments (only dynamic measured portion)
L2_setpoint Rotor forces and moments (only dynamic setpoint portion)
M Profile chord
X Blade pitch angle
X1 Pilot primary control input
X2 Blade pitch angle on the blade root
X3 Resulting blade pitch angle
Y Flap angle
Y1 Flap control angle (primary control)
Y2 Flap correction angle (secondary control)
Y3 Primary flap correction angle (primary control)
Y4 Resulting flap angle
Z1 Disturbance rotor
Z2 Disturbance overall helicopter
t Time

The invention claimed is:

1. Method for controlling a rotary wing aircraft with at least one main rotor, comprising a rotor head and rotor blades (12), arranged such that each rotor blade (12) is supported to be able to pivot or twist around the lengthwise axis of its blade on the rotor head and has at least one control flap (14) that can be deflected, the rotary wing aircraft being controlled only by changing the respective blade pitch angle (X) by means of changing the flap angle (Y) of the assigned control flaps (14) by the resulting blade pitch angle (X3) being set by applying the resulting flap angle (Y4) to the control flap (14) and the resulting flap angle (Y4) being computed using an algorithm, the input quantities comprising the flap control angle (Y1) depending on the pilot primary control and the flap correction angle (Y2) depending on the secondary control, characterized in that periodic actuating signals are generated to check the rotor integrity, wherein the algorithm for computing the resulting quantities comprises superposition.

2. Method according to claim 1, wherein the algorithm for computing the resulting quantity calls for weighting of the input quantities.

3. Method according to claim 2, wherein the secondary control comprises a secondary regulator (24) that suppresses blade flutter and/or reduces dynamic loads and blade vortex interferences.

4. Method according to claim 2, wherein the rotary wing aircraft further includes an automatic flight control system AFCS (26) by which an additional primary flap correction angle (Y3) is generated that is incorporated into the computation of the resulting flap angle (Y4).

5. Method according to claim 1, wherein the rotary wing aircraft further includes an automatic flight control system AFCS (26) by which an additional primary flap correction angle (Y3) is generated that is incorporated into the computation of the resulting flap angle (Y4).

6. Method according to claim 5, wherein the AFCS (26) generates the primary flap correction angle (Y3) depending on the setpoint values of the flight status (F_setpoint) and the measured values of the flight status (F_measured) transmitted from the connected sensors.

7. Method according to claim 1, wherein control of a blade root actuator additionally takes place as collective control.

8. Method according to claim 7, wherein in addition, control anchored in a fixed system takes place as collective control and the blade pitch angle is set via concomitantly turning control rods that are moved via a transmission element by an actuator in the fixed system.

9. Method according to claim 1, wherein the secondary control comprises a secondary regulator (24) that suppresses blade flutter and/or reduces dynamic loads and blade vortex interferences.

10. Method for controlling a rotary wing aircraft with at least one main rotor, comprising a rotor head and rotor blades (12), arranged such that each rotor blade (12) is supported to be able to pivot or twist around the lengthwise axis of its blade on the rotor head and has at least one control flap (14) that can be deflected, the rotary wing aircraft being controlled only by changing the respective blade pitch angle (X) by means of changing the flap angle (Y) of the assigned control flaps (14) by the resulting blade pitch angle (X3) being set by applying the resulting flap angle (Y4) to the control flap (14) and the resulting flap angle (Y4) being computed using an algorithm, the input quantities comprising the flap control angle (Y1) depending on the pilot primary control and the flap correction angle (Y2) depending on the secondary control, characterized in that periodic actuating signals are generated to check the rotor integrity, wherein the secondary control comprises a secondary regulator (24) that suppresses blade flutter and/or reduces dynamic loads and blade vortex interferences.

11. Method according to claim 10, wherein the secondary regulator (24) generates a flap correction angle (Y2) depending on the setpoint values of the dynamic portions of the rotor forces and moments (L2_setpoint), and the measured values of the dynamic portions of the rotor forces and moments (L2_measured) transmitted from the connected sensors.

12. Method for controlling a rotary wing aircraft with at least one main rotor, comprising a rotor head and rotor blades (12), arranged such that each rotor blade (12) is supported to be able to pivot or twist around the lengthwise axis of its blade on the rotor head and has at least one control flap (14) that can be deflected, the rotary wing aircraft being controlled only by changing the respective blade pitch angle (X) by means of changing the flap angle (Y) of the assigned control flaps (14) by the resulting blade pitch angle (X3) being set by applying the resulting flap angle (Y4) to the control flap (14) and the resulting flap angle (Y4) being computed using an algorithm, the input quantities comprising the flap control angle (Y1) depending on the pilot primary control and the flap correction angle (Y2) depending on the secondary control, characterized in that periodic actuating signals are generated to check the rotor integrity, wherein the secondary control comprises a secondary regulator (24) and the rotary wing aircraft further includes an automatic flight control systems AFCS (26), wherein the secondary regulator (24) and/or the AFCS (26) work according to regulation processes of the $H_\infty$ or "least-mean-square method" or according to disturbance rejection by means of notch filters.

* * * * *